Figure 1:
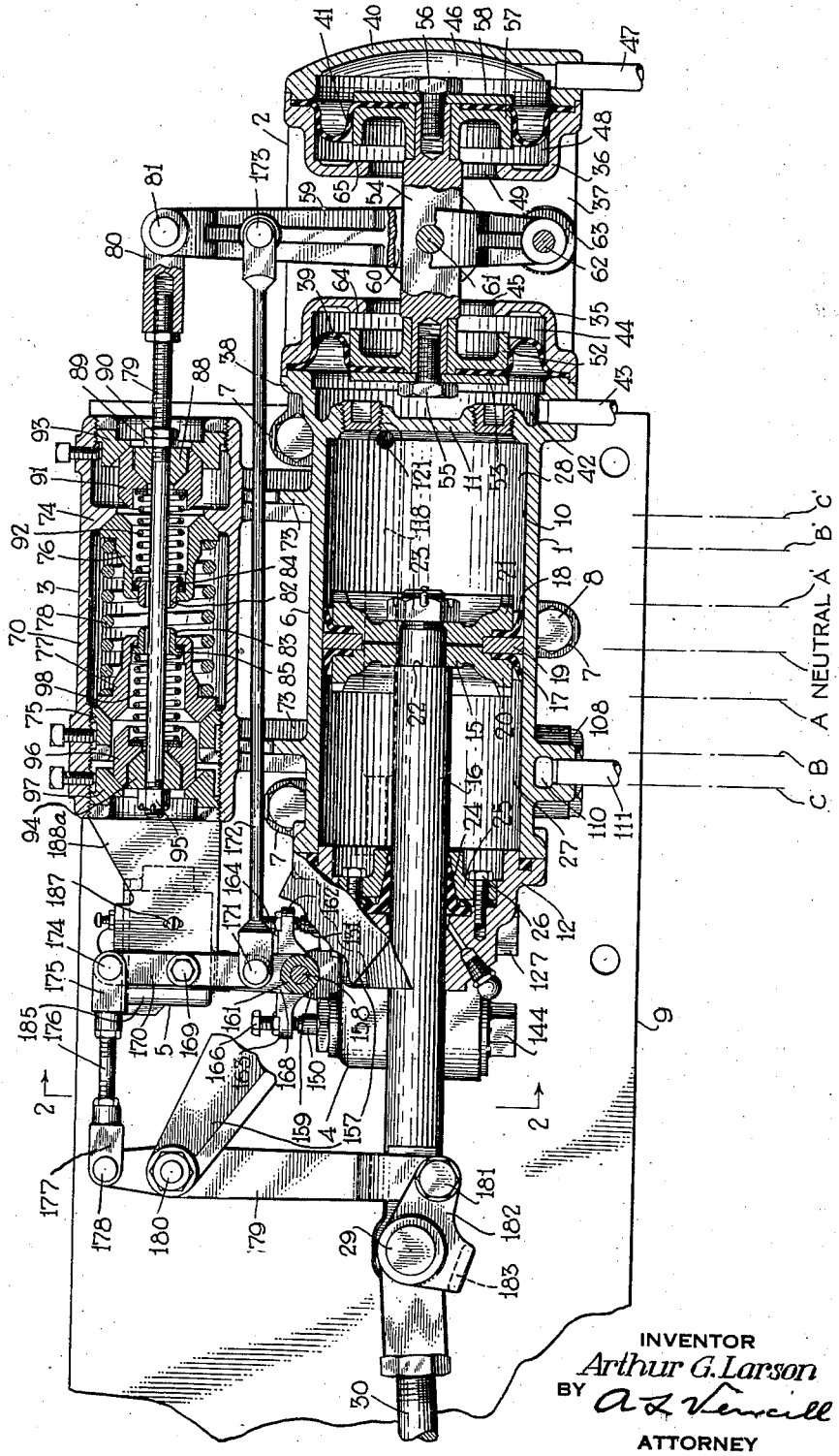

April 1, 1947.  A. G. LARSON  2,418,129

FOLLOW-UP PRESSURE FLUID SERVO-MOTOR

Filed Dec. 31, 1942  2 Sheets-Sheet 2

INVENTOR
*Arthur G. Larson*
BY
ATTORNEY

UNITED STATES PATENT OFFICE 2,418,129

FOLLOW-UP PRESSURE FLUID SERVOMOTOR

Arthur G. Larson, Forest Hills, Pa., assignor to The Westinghouse Air Brake Company, Wilmerding, Pa., a corporation of Pennsylvania Application December 31, 1942, Serial No. 470,803

6 Claims. (Cl. 121—41)

This invention relates to control apparatus and more particularly to the type embodying a fluid controlled motor device.

In the copending application of Roy R. Stevens, Serial No. 463,792, filed October 29, 1942, issued as Patent No. 2,383,278 on August 21, 1945, there is disclosed a control apparatus comprising a fluid motor embodying a power piston which is operable upon establishing a differential between fluid pressures acting on opposite sides to move a device to be controlled. The operating differential is destroyed upon the device obtaining the desired position for stopping movement of the piston. A valve arrangement is provided for controlling the opposing fluid pressures on the power piston. A pilot piston connected to the valve arrangement is operable by fluid pressure to different positions, corresponding to the desired positioning of the power piston, to actuate the valve arrangement to establish the differentials in fluid pressures on the power piston for moving the same. The valve arrangement is also connected to the power piston which operates upon obtaining the position corresponding to that of the pilot piston for destroying the differential in pressures on the power piston to stop movement thereof. A spring arrangement is provided in the casing containing the pilot piston for direct cooperation therewith to define different positions of the pilot piston corresponding to positions of the device being controlled to which the power piston is connected. By thus defining the positions of the pilot piston and providing arrangements for moving the power piston to corresponding positions to effect like positioning of the device being controlled, accurate positioning of said device in accordance with the positioning of the pilot piston is obtained.

However, in this structure the pilot piston is not as sensitive to slight changes in the controlling pressure thereon as desired and as a result the power piston cannot be as accurately positioned as desired. This is due partly to the relatively small size of the pilot piston and partly due to the fact that said piston is of the type provided with flexible packing cups having sliding contact with the wall of a cylinder bore. Thus friction and variations thereof between the packing cups and the wall of the bore interferes with the desired sensitivity and the exactness of positioning of the pilot piston in response to a slight change in the pressure of the actuating fluid.

Flexible diaphragms are not affected by sliding friction like packing cups, as well known. Diaphragms could not however be employed in place of the pilot piston structure above described since the required movement of the pilot piston greatly exceeded permissible deflection of the usual diaphragms and this movement could not be practicably reduced since it was limited by pressure change characteristic of the springs associated with the pilot piston.

One object of the invention is therefore the provision of an improved control apparatus comprising a fluid motor embodying a pilot structure having greater sensitivity to slight changes in fluid pressure and which is operable with a greater degree of accuracy in response to changes in fluid pressure than the structure above described.

According to this object I provide a pilot structure embodying flexible diaphragms of relatively large area, as compared to the area of the pilot piston above described, and I limit the deflection of the diaphragms to a permissible value. The spring structure for defining the different positions of the pilot diaphragms is disposed remote from the diaphragms and connected thereto by lever means which for a certain movement of the diaphragms provides for greater movement of the spring structure thereby permitting the use of springs having change in pressure characteristics best adapted to provide with accuracy the definite controlling pressures required in the different positions of the pilot structure or diaphragms.

In the structure disclosed in the above referred to Stevens application, the valve arrangement for controlling the pressure of fluid on opposite sides of the power piston embodies plungers subject to such pressure and which pressure opposes positioning of the pilot structure and thus interferes to a certain degree with the accuracy in operation thereof.

Another object of the invention is therefore the provision of an improved valve structure such as just defined but which requires less force for operating and in which the reaction of the fluid pressure supplied by the valve structure on the pilot structure is less than in the structure above referred to and substantially negligible, so as to provide greater accuracy in positioning of the pilot structure and greater sensitivity of the pilot structure to changes in pressure of fluid thereon.

Another object of the invention is the provision of an improved fluid controlled motor device.

Figure 2:
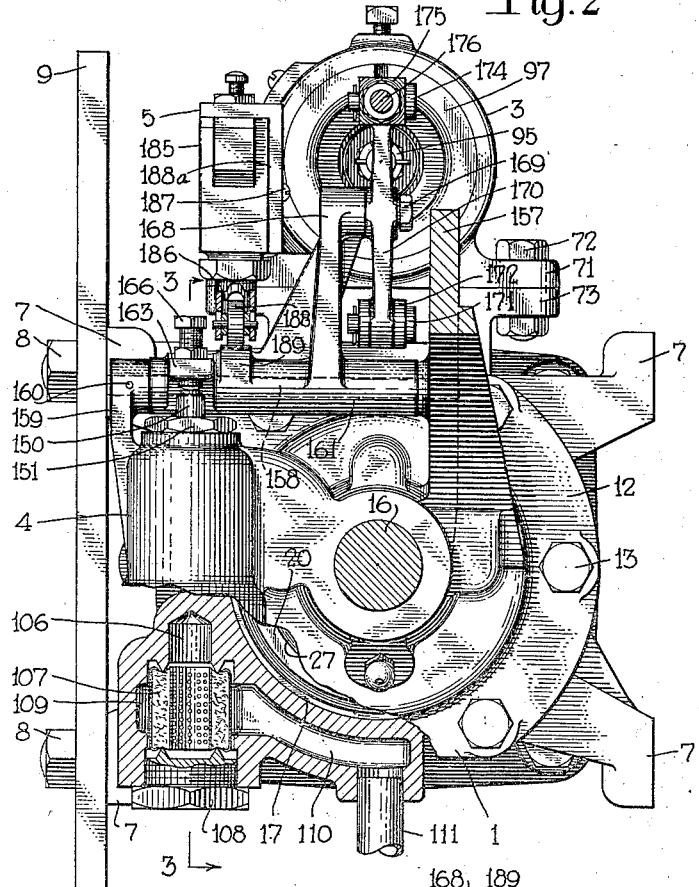
Figure 3:
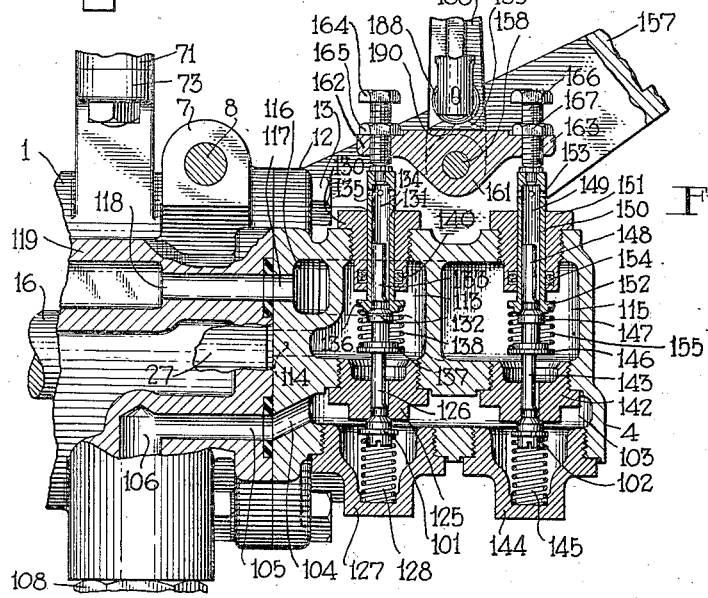

Other objects and advantages will be apparent from the following more detailed description of the invention:

In the accompanying drawings; Fig. 1 is a sectional view taken longitudinally through the improved fluid motor structure; Fig. 2 is a sectional view taken substantially on the line 2—2 in Fig. 1 and having certain parts broken away to show interior construction; and Fig. 3 is a sectional view taken on the line 3—3 in Fig. 2.

*Description*

As shown in the drawing, the improved control apparatus comprises a power device 1, a pilot device 2, a spring device 3, a supply and release valve structure 4, a switch device 5, and rods and levers which will be later described.

The power device 1 comprises a cylinder 6 having mounting lugs 7 projecting therefrom and secured by bolts 8 to a mounting panel or the like, designated by the reference numeral 9, on which it is desired to mount the structure.

The power cylinder 6 has a piston bore 10 one end of which is closed by a pressure head 11 formed integral with the cylinder while the opposite end of said bore is closed by a removable pressure head 12 secured to the cylinder by bolts 13.

A piston 15 slidably mounted in bore 10 is secured to one end of a piston rod 16 which extends through a suitable bore in the pressure head 12 to the exterior of the cylinder. The piston 15 comprises two oppositely arranged flexible packing cups 17 and 18 clamped between a central ring 19 and two oppositely arranged followers 20 and 21, the follower 20 being mounted on the piston rod against a shoulder 22. A nut 23 having screw-threaded engagement with the end of the piston rod is tightened against the follower 21 to thereby clamp the two packing cups in place, as above mentioned.

A suitable packing 24 is provided around the piston rod 16 within the pressure head 12 and is held in position by a gland 25 secured to said head by cap screws 26, said packing being provided to prevent leakage of fluid under pressure from a chamber 27 formed at one side of the piston past the piston rod to atmosphere. At the opposite side of the piston is a pressure chamber 28. The packing cup 18 is arranged to prevent leakage of fluid under pressure from chamber 28 past the piston, while the packing cup 17 is arranged to prevent leakage of the fluid under pressure from chamber 27 past the piston.

The end of the piston rod 16, exteriorly of the pressure head 12, is pivotally connected by a pin 29 to one end of a rod 30 the opposite end of which rod may be connected to a device to be operated, such as the maneuvering gear on a water-craft as disclosed in the aforementioned pending Stevens application. The piston 15 is arranged to be moved in either one direction or the opposite direction by differentials in fluid pressure created in chambers 27 and 28 for moving the device to be operated to any selected one of a plurality of positions, it being apparent that said piston will occupy the same position as the device to which the rod 30 may be connected.

For the purpose of illustration, the different positions of the device to be operated and thereby of piston 15 may be such as indicated in Fig. 1 by spaced dash and dot lines. These positions may include a neutral position as indicated by the dash and dot line bearing the legend "Neutral." At the left-hand side of "neutral" position there may be three positions such as indicated by dash and dot lines bearing the legends "A," "B," and "C" while at the opposite side of "neutral" position there may be three other positions as indicated by the legends "A'," "B'," and "C'."

The specific device to be controlled by piston 15 the different positions of such device, and what is accomplished in said positions is immaterial to the present invention and a further description thereof is not essential.

The pilot device 2 comprises a structure embodying two coaxially aligned cup-like elements 35 and 36 arranged with their open ends away from each other and rigidly connected together in spaced relation by two parallel ribs or flanges 37, only one of which is shown. Projecting from the pressure head 11 in the direction away from bore 10 is an annular flange 38 to the periphery of which the cup-like element 35 is rigidly secured, a flexible diaphragm 39 being clamped around its periphery between the flange 38 and cooperating part of the cup-like element 35. The open end of the cup-like element 36 is closed by a concave cover 40 secured thereto, and between the periphery of said cover and that of said element is clamped flexible diaphragm 41. Between the diaphragm 39 and the pressure head 11 is a pressure chamber 42 which is connected to a control pipe 43, while at the opposite side of said diaphragm is a chamber 44 which is open to the atmosphere through a relatively large opening 45 in the bottom of the cup-like element 35. A pressure chamber 46 is provided between cover 40 and diaphragm 41 and is open to a control pipe 47. At the opposite side of diaphragm 41 is a chamber 48 which is open to the atmosphere through a relatively large opening 49 provided through the bottom wall of the cup-like element 36.

A diaphragm follower 52 contained in chamber 44 is mounted against one side of the diaphragm 39 and a follower plate 43 is mounted against the opposite side in chamber 42. The follower 52 is mounted against a shoulder on one end of a connecting rod 54 which extends between the two diaphragms through openings 45 and 49 and into chambers 44 and 48 in the two cup-like elements. The one end of the connecting rod 54 extends through the diaphragm 39 into contact with the follower plate 53 and a cap screw 55 having its head in engagement with the opposite side of said follower plate extends into the end of the connecting rod to thereby secure the follower 52 and plate 53 to opposite sides of the diaphragm and to the one end of the connecting rod 54. The opposite end of the connecting rod 54 is connected to diaphragm 41 by a cap screw 56 and a like follower 57 and follower plate 58 disposed at opposite sides of the diaphragm 41 in chambers 48 and 46, respectively.

Intermediate the cup-like elements 35 and 36 the connecting rod 54 extends through an opening provided in a lever 61 intermediate its ends, and a pin 61 extending through the opposite walls of said opening and said connecting rod pivotally connects these two parts together. One end of the lever is pivotally mounted on a pin 62 supported at opposite ends in bosses 63 projecting inwardly from the adjacent faces of ribs 37 below the connecting rod 54.

When fluid under pressure is supplied to pipe 43 with pipe 47 and thereby chamber 46 open to the atmosphere, the pressure of fluid thus obtained in chamber 42 on diaphragm 39 will deflect same in the direction of the right-hand and rock the lever 59 about the fulcrum pin 62 in a clockwise direction. In case fluid pressure is supplied to pipe 47 and thus to chamber 46 when pipe 43 and chamber 42 are open to the atmosphere, the diaphragm 41 will deflect in the direction of the left-hand and rock the lever 59 in a counterclockwise direction about the fixed fulcrum pin 62. Deflection of the diaphragm 39 toward the right-hand is arranged to be limited by engagement of follower 52 with an annular stop shoulder 64 provided in the cup-like element 35, while deflection of diaphragm 41 in the direction of the left-hand is arranged to be limited by a corresponding shoulder 65 provided in the cup-like element 36. It will be noted that the two diaphragms will move together in either direction due to the connection therebetween by rod 54.

The means for supplying fluid under pressure to either of the pipes 43 or 47 and for varying the pressure therein while retaining the other pipe open to atmosphere is immaterial to the present invention, but may, as an example, be like that shown in the copending Stevens application hereinbefore referred to.

The spring device 3 comprises a tubular casing 70 arranged parallel to the bore 10 in the power cylinder 6 and having mounting lugs 71 secured by bolts 72 to lugs 73 provided on the power cylinder 6. The tubular casing is provided internally and adjacent one end with an inwardly extending annular wall 74, and similarly located adjacent the opposite end of the casing is an adjusting nut 75 having screw-threaded engagement with the casing interiorly thereof. Between the wall 74 and nut 75 are two movable pressure members 76 and 77 engaged by opposite ends of a coil spring 78 which is under pressure and therefore effective to urge said members apart into contact with said wall and nut, respectively. The spring 78 is also effective to oppose movement of member 76 out of engagement with wall 74 and to also oppose movement of member 77 out of engagement with nut 75.

A rod 79 loosely extending centrally through the two pressure members 76 and 77 has one end adjustably connected by screw-threads to one end of a link 80 the opposite end of which is connected by a pin 81 to the upper or free end of the diaphragm controlled lever 59. Loosely mounted on the rod 79 are two sleeves 82 and 83 extending through openings provided centrally in the pressure members 76 and 77 and having on their opposite ends collars 84 and 85 arranged to engage respectively the opposite faces of the pressure members 76 and 77 immediately adjacent and surrounding the rod 79.

Between wall 74 and link 80 a member 88 is mounted on the rod 79 against a nut 89 secured in position by a lock nut 90. The member 88 supports a stop 91. A coil spring 92 encircling rod 79 and under pressure bears at one end against collar 84 on sleeve 82 and at the opposite end against the stop 91. The inner end of stop 91 is arranged to engage the outer face of pressure member 76, while the outer face of stop 91 is arranged to engage an adjusting nut 93 having screw-threaded engagement interiorly with the tubular casing 70.

A member 94 is mounted on the opposite end of rod 79 and is held in place by a nut 95. The member 94 carries a stop 96 like the stop 91. The stop 96 is interposed between the pressure member 77 and an adjusting nut 97 having screw-threaded engagement interiorly with the tubular casing. A coil spring 98 like spring 92 and encircling rod 79 is interposed under pressure between and bears against the stop 96 at one end and collar 85 at the opposite end.

When both pressure chambers 42 and 46 in the pilot device 2 are open to the atmosphere, the parts of the spring device 3 will occupy the positions shown due to the action of spring 78 urging the pressure members 76 and 77 into contact with wall 74 and adjusting nut 75, respectively, and which therefore position the sleeves 82 and 83 as shown in the drawing. With the sleeves 82 and 83 thus positioned, the pressure of spring 92 will urge the stop 91 into contact with the adjusting nut 93 while the pressure of spring 98 will urge the stop 96 into contact with the adjusting nut 97. With the parts thus conditioned, the nut 89 will be adjusted to urge the member 88 into contact with stop 91 while the nut 95 will be adjusted for urging the member 94 into contact with the stop 96. With these parts in the condition just described, the link 80 will be adjusted on the rod 79 for positioning the diaphragm operated lever 59 in a neutral position in which it is shown in the drawing.

When fluid under pressure is supplied to chamber 42 through pipe 43, with pipe 47 and chamber 46 vented, and is increased on the diaphragm 39 to a degree sufficient for overcoming the pressure of spring 98 on stop 96, the lever 59 will be rocked in a clockwise direction and through rod 79 will pull the stop 96 out of engagement with the adjusting nut 97 and move same in the direction of the pressure member 77. After a certain degree of movement incident to a further increase in pressure of fluid in chamber 42, the stop 96 will engage the pressure member 77 and then further movement will be opposed by the force of spring 78 on said pressure member and this will require a definite further increase in pressure of fluid in chamber 42 on the diaphragm 39. Thus, as will be apparent, engagement between the stop 96 and pressure member 77 will definitely define a position of lever 59 at the right-hand side of its neutral position.

When the pressure of fluid in chamber 42 is then further increased to a degree sufficient to overcome the force of spring 78 on the pressure member 77, the lever 59 will be rocked further in a clockwise direction and thereby move the pressure member 77 against spring 78 and such movement will continue as the pressure of fluid in chamber 42 is increased until the end of sleeve 83 engages the end of sleeve 82 whereupon the pressure of spring 92 will become effective to oppose further movement of the diaphragm operated lever 59. The precompressed force of spring 92 on sleeve 82 thus acts to define a second position of the diaphragm operated lever 59 at the right-hand side of its neutral position. Upon a still further increase in pressure in diaphragm chamber 42 to a degree which overcomes the opposing forces of spring 78 on the pressure member 77 and of spring 92 on sleeve 82, the diaphragm 39 will then act to rock the lever 59 further in a clockwise direction until the diaphragm follower 52 engages the stop 64 in the cup-like element 35. This engagement prevents further deflection of diaphragm 39 and thereby rocking of the lever 59 in a clockwise direction and thus defines a third position of said lever at the right-hand side of its neutral position.

When diaphragm chamber 42 is open to the atmosphere and fluid under pressure is supplied through pipe 47 to chamber 46 to act on the diaphragm 41, said diaphragm will deflect to rock the lever 59 in a counterclockwise direction. This deflection of diaphragm 41 will initially move the stop 91 away from the adjusting nut 93 against the force of spring 92 and into contact with the pressure member 76 which will define one position of the lever 59 to the left of its neutral position. As the lever 59 is then moved further in a counterclockwise direction upon a sufficient increase in pressure on the diaphragm 41, the member 76 will move against the force of spring 78 until the sleeve 82 contacts the sleeve 83 which will define a second position of the lever 59 at the left-hand side of its neutral position. When the pressure of fluid in chamber 46 is still further increased to a sufficient degree to then overcome the additional opposing force of spring 98, said lever will be rocked further in a clockwise direction until the follower 57 engages the stop 65 in the cup-like element 36 which will define a third position of the lever 59 at the left-hand side of its neutral position.

It will thus be seen that the lever 59 is rockably out of neutral position in either one direction or the opposite direction, upon supply of fluid under pressure to either chamber 42 or 46 with the other chamber open to atmosphere, to positions defined by the cooperation of different parts in the spring device 3 and determined by the pressure of fluid supplied to the respective chambers 42 or 46.

The supply and release valve structure 4 is preferably formed integrally with the pressure head 12 at one side of the bore therein through which the power piston rod 16 operates and comprises two fluid pressure supply valves 101 and 102 which are spaced apart in a direction parallel to the axis of said rod. The two supply valves are both contained in a chamber 103 which is connected by a passage 104 in the pressure head 12 to a registering passage 105 provided in the power cylinder 6. The passage 105 leads to a passage 106 which is open to the interior of a ring-shaped air cleaner 107. This air cleaner is mounted in a cavity in the power cylinder 6 and is secured in place by a cap nut 108. An annular cavity 109 provided in the power cylinder 6 around the exterior of the strainer 107 is connected through a passage 110 in said cylinder to a fluid pressure supply pipe 111 which is connected to the bottom of the cylinder, as viewed in the drawing. This pipe is provided for connection with any suitable source of fluid under pressure, so that in use fluid will be constantly supplied through the air strainer 107 to chamber 103 in pressure head 12 containing the two fluid pressure supply valves 101 and 102.

Directly above the supply valve 101 the pressure head 12 is provided with a chamber 113 which is connected by a passage 114 to pressure chamber 27 at one side of the power piston 15. Directly above the supply valve 102 the pressure head 12 has a chamber 115 which is connected by a passage 116 extending around back of chamber 113 as seen in Fig. 3, to a passage 117 which registers at the end of the pressure head 12 engaging the power cylinder with a passage 118 in said cylinder. The passage 118 is provided through a rib 119 on the exterior of cylinder 6 extending to the pressure head 11 at which point a passage 121 is provided which connects passage 118 to the pressure chamber 28.

A cap nut 125 is secured in an opening provided in the wall separating chambers 103 and 113 and this nut is provided axially with a bore in which is slidably mounted a fluted stem 126 projecting from the supply valve 101, said nut being provided on the end in chamber 103 with a seat for cooperation with said supply valve. A cap nut 127 closes an opening through the lower wall of chamber 103 and supports a spring 128 which bears against the supply valve 101 for urging same to its seated position shown.

A cap nut 130 axially aligned with the nut 125 is secured in the upper wall of chamber 113 by screw-threaded engagement and is provided with an axial bore in which is slidably mounted a tubular plunger 131 extending from within chamber 113 to a point above the outer end of nut 130. A fluid pressure release valve 132 contained in chamber 113 has a fluted stem 133 extending into the bore 134 in plunger 131, this bore being open above the outer end of nut 130 to the atmosphere through one or more ports 135. The plunger 131 is provided in chamber 113 around the open end of bore 134 with a seat for cooperating with the release valve 132 to close communication between chamber 113 and said bore, and surrounding this seat the plunger is provided with an annular collar 136. The release valve 132 is provided with a depending stem portion supporting at its lower end a spring seat 137 which engages the end of the supply valve stem 126. A coil spring 138 under pressure and encircling the depending stem portion of the release valve bears at one end against collar 136 on plunger 131 and at the opposite end against the spring seat 137 for urging the plunger out of seating engagement with the release valve 132. The cap nut 130 is provided with an annular cavity encircling the plunger 131 and containing a ring packing 140 contacting the bottom of said cavity and the peripheral surface of the plunger for preventing leakage of fluid pressure from chamber 113 past the plunger to the atmosphere.

The valve structure embodying the supply valve 102 is identical to that embodying the supply valve 101 and just described, in that the supply valve 102 is arranged to seat on the end of a cap nut 142 secured by screw-threaded engagement in a wall separating the supply chamber 103 from chamber 115. The supply valve 102 has a fluted stem 143 slidably mounted in a bore provided axially through the cap nut 142. Below the supply valve 102 an opening in the lower wall of chamber 103 is closed by a cap nut 144 which carries a spring 145 bearing against the supply valve 102 for seating same. In chamber 115 the supply valve stem 143 contacts a spring seat 146 provided on a depending portion of a fluid pressure release valve 147 having a fluted stem 148 disposed to slide in a bore 149 provided in a tubular plunger 150. The plunger 150 is slidably mounted in a bore provided through a cap nut 151 secured in the upper wall of chamber 115. The plunger 151 is provided in chamber 115 with a seat for engaging the release valve 147 and surrounding said seat said plunger has an annular collar 152. A coil spring 153 encircling the depending portion of the release valve 152 bears at one end against the spring seat 146 and at the opposite end against collar 152 for urging the plunger 152 out of seating engagement with the release valve. The bore 149 in plunger 150 is open to the atmosphere above the cap nut 151 through one or more ports 153. The cap nut 151 has adjacent its lower end an annular cavity surrounding the plunger 150 and containing a ring-like packing 154 engaging the bottom wall of said cavity and the peripheral surface of said plunger for preventing leakage of fluid under pressure from chamber 115 past said plunger to the atmosphere.

It will be noted that the diameter of plungers 131 and 150 is substantially no greater than the diameter of the seat on the release valves 132 and 147, respectively, so that a minimum of force will be required to move said plungers into chambers 113 and 115 against pressure of fluid acting therein during operation of the device, which will be later described.

On the side of piston rod 16 opposite the valve structure 4 just described, the pressure head 12 is provided with an arm 157 extending away from the pressure head and diagonally to the axis of the piston rod. A rod 158 disposed at right angles to the axis of the power piston rod 16 and substantially midway between the ends of plungers 131 and 150 projecting above the respective cap nuts 130 and 151 is supported at one end in the arm 157 while the opposite end is supported in an arm 159 projecting from the pressure head 12 at the opposite side of the valve structure 4, said rod being secured in place by a pin 160 provided through the arm 159 and the end of said rod therein.

A lever member comprising a sleeve 161 is journaled on the rod 158 between the arms 157 and 159. The sleeve 161 is provided adjacent the arm 159 with two oppositely arranged lever arms 162 and 163 extending over and spaced from the ends of plungers 131 and 150, respectively. An adjusting screw 164 is screw-threaded through the arm 162 in alignment with the end of plunger 131 and into engagement therewith, a lock nut 165 being provided on said screw for engagement with said arm to secure said screw in an adjusted position. A similar adjusting screw 166 is provided in the arm 163 in alignment with and for engaging the outer end of plunger 150, and a lock nut 167 on said screw is provided for engagement with said arm to secure the screw in an adjusted position.

The sleeve 161 is provided between the arms 162 and 163 and the arm 157 projecting from the pressure head 12 with an upwardly extending lever 168 and secured to the free end of this lever at its center and by a cap screw 169 is an equalizing lever 170 normally extending in a substantially vertical direction directly over the axis of the power piston rod 16, as viewed in the drawing. The lower end of lever 170 is connected by a pin 171 to one end of a connecting rod 172 which extends through space provided between the power cylinder 6 and the tubular casing of the spring device 3 and which has its opposite end connected by a pin 173 to the diaphragm operated lever 59 between the connections of said lever with the diaphragms and the spring connecting rod 79.

The opposite end of the equalizing lever 170 is connected by a pin 174 to one end of a link 175, the opposite end of which is adjustably connected by screw-threads to one end of a rod 176. The other end of the rod 176 is adjustably connected by screw-threads to one end of a link 177 the opposite end of which is connected by a pin 178 to one end of a lever 179 which is fulcrumed intermediate its ends and adjacent the pin 178 on a pin 180 provided in the end of arm 157 projecting from the pressure head 12. The opposite end of lever 159 is bifurcated to straddle the piston rod 16 and is connected by pins 181 to the aligned ends of two links 182 disposed at opposite sides of the piston rod and only one of which can be seen in the drawing, said links being connected together beneath the end of the piston rod by a bridge 183. The opposite ends of links 182 are pivotally connected with pin 29.

The switch device 5 comprises a casing 185 containing a vertically movable plunger 186 disposed over the operating sleeve 161 and secured in this position by one or more screws 187 extending through an arm 188a projecting from the tubular spring housing 70 and into said casing. In the switch casing are contacts (not shown) for controlling an electric circuit and these contacts are arranged for control by the plunger 186; movement of the plunger into the casing being operative to close the contacts and movement of the plunger out of said casing being operative to open said contacts. The invention resides in the provision of means for controlling movement of the plunger 186, in view of which, the structure of the switch within the casing and its purpose are immaterial to the invention.

In the lower end of plunger 186 is a roller 188 disposed directly over the operating sleeve 161 which is provided with a cam 189 for controlling the positioning of said plunger. The cam 189 is provided with a recess 190 to receive the roller 188 when the operating lever 168 is in a vertical and neutral position as shown in the drawing. Movement of this lever in either direction from the neutral position is arranged to move the recess 190 out of registry with the roller 188 for thereby urging said roller and the plunger 186 in the direction of the switch casing 185 for actuating the switch therein to close the electric circuit controlled by said switch. Return of the lever 168 to its neutral position will move the recess 190 under the roller 188 to permit the plunger 186 to be returned to its circuit opening position shown.

*Adjustments*

Let it be assumed that both diaphragm chambers 42 and 46 are at atmospheric pressure and that the diaphragm operated lever 59 is connected by rod 172 to the lower end of the equalizing lever 170 and that the connection between the spring rod 79 and link 80 is so adjusted that the diaphragm actuated lever 59 will be substantially in its neutral position and that the valve operating lever 168 will be in its neutral position shown with the pressure members 76 and 77 urged into contact with the wall 74 and adjusting nut 75, respectively, and with the stops 91 and 93 urged into contact with the adjusting nuts 93 and 97. Let it further be assumed that the power piston 16 is in its "neutral" position shown and operatively connected to the lever 179 which under this condition may also occupy a neutral position shown at right angles to the axis of the piston rod. The connecting rod 176 will then be adjusted to and connected with the lever 179 and equalizing lever 170. With the parts adjusted as above described the arms 162 and 163 projecting from sleeve 161 will be disposed substantially equidistant from the ends of the respective plungers 131 and 153.

Let it further be assumed that pipe 111 is supplied with fluid under pressure and that the supply valve chamber 103 will as a consequence be charged with fluid pressure. The two adjusting screws 164 and 166 will then be adjusted in arms 162 and 163 into contact with the plungers 131 and 150 and then screwed inwardly to urge said plungers into seating engagement with the release valves 132 and 147, respectively. Each of the adjusting screws 164 and 166 will then be screwed into the arms 162 and 163 to a slightly greater extent for unseating the supply valves 101 and 102, respectively, to allow fluid under pressure to flow from chamber 103 to chambers 113 and 115 and thence to pressure chambers 27 and 28 at opposite sides of the power piston 15.

The supply valves 101 and 102 may be unseated, as just described, to an extent which will allow the pressure of fluid supplied to the valve chamber 103 to equalize into chambers 27 and 28 at the opposite sides of the power piston 15, or in other words, the adjustment will be such as to hold both of said valves open. However, it is preferred that both of the supply valves be unseated to a lesser degree so that when a certain pressure intermediate that of the atmosphere and of that supplied to chamber 103 is attained on the opposite sides of the power piston, such pressure acting in chambers 113 and 115 on the ends of plungers 131 and 150, respectively, will urge said plungers outwardly sufficiently to allow the two supply valves 101 and 102 to seat. With this latter adjustment the supply valves 101 and 102 will initially be unseated by screws 164 and 166 a very small degree, such as for example one-thousandth of an inch, under which condition it has been found that both of said valves will seat upon obtaining the intermediate degree of pressure on opposite sides of the power piston as above described, such seating being due, it is believed, to give or deflection in some part or parts of the structure connecting the supply valves to the actuating sleeve 161.

In case both supply valves 101 and 102 are adjusted to remain open, it will be seen that the pressure of fluid obtained on opposite sides of the power piston will be the same, as is also the case with such adjustments of screws 164 and 166 as to provide for seating of said supply valves upon obtaining the intermediate degree of fluid pressure on opposite sides of the power piston. In either case the power piston will be in a static condition and in both cases the pressure of fluid acting in the chambers at the opposite sides of said piston will press the skirt portions of the packing cups 17 and 18 against the wall of the bore 10 with force to stabilize the piston against undesired shifting in said bore due to vibration or the like incident to the installation of the structure.

The force of the packing cups 17 and 18 acting against the wall of bore 10 either alone or in conjunction with the resistance to movement of the device (not shown) to which the rod 30 may be connected, also acts to hold the piston against movement when the opposite sides of the piston are subject to fluid at the same pressure, even though the area of the piston 15 subject to fluid pressure in chamber 27 is less than that subject to pressure of fluid in chamber 28 by an amount equal to the area of the piston rod 16.

Operation

Let it be assumed that with diaphragm chamber 46 open to the atmosphere, fluid under pressure is supplied through pipe 43 to chamber 42 to deflect diaphragm 39 in the direction of the right-hand and thereby rock lever 59 in a clockwise direction to any desired position determined by the pressure of fluid supplied to chamber 42 and the opposing pressure of one or more of the springs of the spring device 3. This movement of the diaphragm lever 59 will act through the connecting rod 2 to turn the equalizing lever 170 in a counterclockwise direction about its fulcrum connection with pin 174, the pin 174 being held at this time against movement due to the relatively great reluctance to movement of the power piston 15. This rocking of the equalizing lever 170 in a counterclockwise direction will act through the cap screw 169 to turn the lever 168 and thereby the operating sleeve 161 and arms 162 and 163 connected to the valve actuating plungers 131 and 150 in a clockwise direction.

It will be noted that since the connecting rod 172 is connected to one end of equalizing lever 170 and the sleeve actuating arm 168 is connected to said lever at its center, a relatively small force applied through the connecting rod 172 will turn the arm 168 and sleeve 161. Moreover, with the actuating sleeve 161 in its neutral position in which the release valves 132 and 147 are both closed and chambers 113 and 115 are charged with fluid at the same degree of pressure such pressure acting on the plunger 131 equals the opposing pressure of fluid on plunger 150 so that a relatively small degree of force is required for initiating turning of the sleeve actuating arm 168 in a clockwise direction as just described.

When the sleeve actuating arm 168 is rocked in a clockwise direction as viewed in Fig. 1 or in a counterclockwise direction as viewed in Fig. 3, the arm 162 will move the plunger 131 inwardly through the cap nut 130 and since the end of said plungers is at this time in contact with the release valve 132, said valve will be moved with the plunger and move the supply valve 101 away from its seat. If chamber 113 and the connected chamber 27 at one side of the power piston were both charged with the full degree of pressure provided in the supply pipe 111 with the sleeve actuating arm 168 in its neutral position, this movement of the supply valve 101 will be merely a further unseating thereof and of no consequene, but in case the adjusting screw 164 had been adjusted to allow closure of the supply valve 101 upon obtaining the intermediate degree of fluid pressure in chamber 27 with the sleeve actuating arm 168 in its neutral position as hereinbefore described, then movement of the supply valve 101 away from its seat will permit fluid under pressure to flow from the supply valve chamber 103 to chamber 113 and thence to chamber 27 for increasing the pressure of fluid on the power piston 15.

At the same time as plunger 131 is moved inwardly as just described, the movement of the sleeve actuating arm 163 in a counterclockwise direction permits the pressure of fluid in chamber 115 and the pressure of spring 155 on the inner end of plunger 150 to move said plunger upwardly through the cap nut 151. In case the screw 166 had been adjusted to hold the supply valve 102 open with the lever 168 in neutral position, this movement of plungers 150 will allow seating of said valve. In either case with the supply valve seated, the outward movement of plunger 150 will be relative to the release valve 147 and out of seating engagement therewith, the release valve 147 being held open by the action of spring 153. With the release valve 152 thus opened fluid under pressure will flow from chamber 115 and the connected chamber 28 at the opposite side of the power piston 15 to the atmosphere by way of bore 149 in said plunger and thence through the ports 153.

This reduction in pressure in chamber 28 at the right hand side of the power piston 15 either by itself or in conjunction with an increase in pressure in chamber 27 at the opposite side of said piston as above described will establish a differential of pressures on said piston which will act to move same in the direction of the right-hand.

Let it be assumed that the diaphragm operating lever 59 is moved to and then stopped in a chosen position to the right of its neutral position, in which case the connecting rod 172 will assume a corresponding position and then hold the lower end of the equalizing lever 170 against movement. The resulting movement of the power piston 15 under the action of fluid under pressure transmitted through lever 179 and link 176 to the upper end of the equalizing lever 170 will then act to turn said equalizing lever in a counter-clockwise direction about its fulcrum connection with pin 171 and thus rock the sleeve operating arm 168 back toward neutral position. As the sleeve operating arm is thus rocked the valve actuating arm 162 will be pulled in a direction away from cap nut 130 to permit the fluid pressure supply valve 101 to move in the direction of its seat under the action of spring 128, and at the same time the arm 163 moving in the opposite direction will move the plunger 153 in the direction of the release valve 152, thereby gradually closing communication between the fluid pressure supply pipe 103 and the power piston chamber 27, and at the same time gradually closing the vent past the release valve 147 from the power piston chamber 28.

If the adjusting screws 164 and 166 were initially adjusted to limit the pressure of fluid acting on the opposite sides of the power piston 15 to some intermediate degree as above described, then when the operating arm 168 is returned by the power piston to its neutral position the higher pressure of fluid in chamber 113 obtained with the lever out of neutral position and acting on plunger 131 will prevent seating of said plunger against the release valve 132 until the pressure of such fluid in chamber 113 and power piston chamber 27 becomes reduced to the intermediate degree before mentioned. At the same time the pressure in chamber 115 and in power chamber 28 acting on the plunger 152 having been reduced with the operating lever 68 out of neutral position, the return of said lever to neutral position will actuate said plunger to crack open the supply valve 102 whereupon the pressure in chamber 115 and in the power piston chamber 28 will be restored to its intermediate degree.

If, however, the adjusting screws 164 and 166 had been adjusted to maintain the supply valves 101 and 102 unseated with the actuating lever 168 in its neutral position then upon return of said lever from a position out of neutral position back to neutral position the valve 101 will remain slightly unseated so that there will be no change in pressure in chamber 113 and the power piston chamber 27, while the inward movement of the plunger 159 will unseat the supply valve 102 and permit fluid to flow from the supply chamber 103 to the power piston chamber 28 to equalize the fluid pressures on the opposite sides of the power piston 15.

In either case, when the lever 168 is returned to its neutral position the pressures of fluid acting on the opposite sides of the power piston 15 will be equalized thereby destroying the actuating force on said piston and causing same to stop in a position determined by the position of the diaphragm actuated lever 59 and thereby the pressure of fluid supplied to chamber 42 for acting on the diaphragm 39.

If the pressure of fluid in chamber 42 is now further increased the lever 59 will be moved to a new and corresponding position and thereby actuate the equalizing lever 170 to again operate the supply and release valve mechanism 4 to establish a differential in pressures on the opposite sides of the power piston 15 following which said piston will operate and actuate said release valve mechanism to destroy such differential and stop the power piston in a new position corresponding to that of the diaphragm actuated lever 59 and diaphragm 39 in the same manner as above described.

Thus the power piston 15 may be caused to move from "neutral" position in the direction of the right hand to a position determined by the position of the diaphragm 39 which in turn is dependent upon the pressure of fluid supplied to chamber 42. If the pressure of fluid supplied to chamber 42 is adequate to deflect the diaphragm 39 to a position in which the follower 52 engages the stop shoulder 64, the lever 59 will be so positioned as to require the piston 15 to move to and be stopped in the position indicated by the legend "C'."

Now let it be assumed that the pressure in chamber 42 is reduced to a degree below that required to hold follower 52 in contact with the stop 63. Upon such a reduction the combined action of springs 78 and 92 on the spring rod 79 will turn the diaphragm actuated lever 59 in a counter-clockwise direction to a position in which the force of said springs balances the pressure of fluid in chamber 42 on the diaphragm 39, thus again positioning the lever 59 and the lower end of the equalizing lever 170 in accordance with the pressure of fluid effective on and thereby the position of the diaphragm 39. Upon this operation the equalizing lever 170 will be turned in a clockwise direction about its fulcrum connection with pin 174 and thereby actuate the sleeve actuating arm 168 in a counter-clockwise direction as viewed in Fig. 1, or in a clockwise direction as viewed in Fig. 3. This movement of arm 168 will permit the plunger 131 to move out of contact with release valve 132 for reducing the pressure in chamber 27 at one side of the power piston, and at the same time unseat the supply valve 102 for increasing the pressure in chamber at the opposite side of the power piston, or in case the adjusting screw 166 were differently adjusted as hereinbefore described the pressure in chamber 28 will be merely maintained at that of the supply fluid. In either case, a differential of pressures will be created on the power piston 15 which will move same in the direction of the left-hand and this movement will actuate the lever 179 and connecting rod 176 to return sleeve actuating lever 168 to its neutral position to thereby effect operation of the supply and release valve structure to equalize the pressures on the power piston 15 and stop same in a new position corresponding to that of the pilot diaphragm 39 and the pressure of fluid acting thereon in the same manner as above described.

It will be apparent that upon further reductions in pressure in chamber 42 and consequent new positioning of lever 59, the supply and release valve structure 4 will again operate to cause movement of the piston 15 further in the direction of the left-hand and to positions corresponding to the positions of the lever 59 and pressures of fluid in the chamber 42 respectively.

If chamber 42 is opened to atmosphere and fluid pressure is supplied through pipe 47 to chamber 46 or released therefrom, it will now be apparent from the above description that the diapragm 41 and lever 59 will assume positions corresponding to the pressure of fluid in chamber 46, and that the supply valve and release valve structure 4 will operate to cause movement of the piston 15 to corresponding positions, in which it will be stopped.

It will now be apparent that if the pressure of fluid supplied to either chamber 42 or chamber 46 is just sufficeint for causing engagement between the adjacent ends of the sleeves 82 and 83 in the spring device 3 as hereinbefore described, the power piston 15 will be caused to move to a position such as indicated by the legend "B" in case the supply of fluid is to chamber 46, or to the position indicated by the legend "B'" if the supply of fluid is to chamber 42. If the pressure of fluid supplied to chamber 42 is however only sufficient for causing movement of stop 96 in the spring device into engagement with pressure member 77 then the lever 59 will be positioned to cause movement of the piston 15 and stop same in a position such as indicated by the legend "A'." On the other hand, if the pressure of fluid supplied to chamber 46 is only adequate to move the stop 91 into contact with the pressure member 76 then the piston 15 will only move to and stop in a position such as indicated by the legend "A."

As before mentioned, when the actuating memzer 168 is in its neutral position the pressures of fluid in chambers 113 and 115 acting on plungers 131 and 150 counteract each other through the arms 162 and 163 of the actuating sleeve 161 so that little force is required on the actuating lever 168 for initiating movement of same out of neutral position, thereby providing for prompt operation of the supply and release valve structure in response to movement of the pilot structure. When the lever 168 is however, moved out of neutral position thereby reducing the pressure of fluid on one plunger without any change or with a corresponding increase in pressure on the other plunger a force is transmitted through the sleeve operated arms 162 and 163 which opposes movement of the actuating arm 168 by the pilot device. This opposing force is however relatively small on account of the small diameter of the two plungers and is substantially inconsequential in view of the relatively large areas of the actuating diaphragms 38 and 41 and the leverage connecting said diaphragms to the operating lever 168.

When the valve actuating sleeve 161 is rocked in either direction out of neutral position the roller 188 in the switch control plunger 186 is moved in the direction of the switch housing for opening the circuit controlled by the switch therein, while upon return of the actuating arm 168 to its neutral position the cam 189 provides for return of the switch plunger 186 to its normal position shown.

Summary

From the above description it will now be seen that I have provided a control apparatus embodying a fluid pressure actuated power piston and a fluid controlled pilot means therefore which is operable to cause the power piston to assume different positions corresponding to chosen operations of the pilot means. The pilot means embodies movable abutments in the form of flexible diaphragms not subject to sliding friction and inaccuracies of adjustment resulting therefrom. Moreover the diaphragms are of relatively large area to provide relatively large control forces upon a relatively small change in pressure of the actuating fluid. A spring arrangement is provided to oppose the pressure of fluid on the diaphragms and to cooperate with such pressure to define positions of the diaphragms corresponding to such pressure.

The permissible deflection of diaphragms is usually however relatively small, so in order to use springs having deflections or change in pressure characteristics required to provide with a desired degree of accuracy the spring opposing forces required in definite positions of the diaphragms, the diaphragms are connected to the spring means through a multiplying lever arrangement providing relatively great deflection of the control spring or springs for relatively small movement of the diaphragms. The relatively great pilot force provided by the cooperative action of fluid pressure on the diaphragms and the opposing force of the spring or springs is in turn multiplied through a lever arrangement connecting same to the supply and release valve structure which also has been arranged to require relatively small actuating force. A multiplying lever arrangement also connects the power piston to the valve structure. Thus the effect of the negligible force required for operating the valve structure on the accuracy of positioning of the pilot device and of the power piston is minimized so that with a maximum degree of promptness and accuracy the power piston may be caused to assume positions corresponding to positions of the operating diaphragms and the pressure of fluid provided thereon.

Having now described my invention, what I claim as new and desire to secure by Letters Patent, is:

1. In combination, a power cylinder, a fluid pressure controlled power piston mounted to reciprocate in said cylinder, valve means associated with said cylinder and including a control member for controlling the pressure of fluid acting on opposite sides of said piston and operable with said control member in a normal position to effect equalization of the opposing pressures on said piston for rendering said piston immovable and being operable upon movement of said control member out of said normal position to establish a differential between said opposing pressures to cause movement of said piston, a structure secured to one end of said cylinder, a flexible diaphragm clamped around its periphery between said structure and the adjacent end of said cylinder and having at one side a pressure chamber, spring means mounted on one side of said cylinder, a control lever having a fulcrum connection with the structure and having one lever arm connected with said diaphragm and another lever arm connected to said spring means, said diaphragm being deflectable upon supply of fluid under pressure to said pressure chamber against the opposing force of said spring means to a position determined by the pressure of fluid in said chamber, a second lever having a fulcrum connection with said cylinder and a connection with said piston, an equalizing lever having an operating connection intermediate its ends with said control member, means connecting said control lever to one end of said equalizing lever, means connecting said second lever to the opposite end of said equalizing lever, said control lever being operable upon deflection of said diaphragm to actuate said equalizing lever for moving said control member out of said normal position, and said piston being operable upon movement relative to said diaphragm for actuating said second lever and thereby said equalizing lever for moving said control member to said normal position.

2. In combination, a power cylinder having a piston bore, a pressure head closing each of the opposite ends of said bore, a piston mounted to reciprocate in said bore, a piston rod having one end secured to said piston and extending through one of said pressure heads, a structure secured to the other of said pressure heads, a flexible diaphragm clamped around its periphery between said other pressure head and the adjacent end of said structure, said other pressure head cooperating with said diaphragm to provide a pressure chamber for receiving fluid under pressure to deflect said diaphragm, a spring housing fixed with respect to said cylinder, spring means mounted in said spring housing, a lever having a fulcrum connection with said structure and operating connections with said diaphragm and spring means, said diaphragm being deflectable by fluid pressure supplied to said chamber against the opposing force of said spring means to a position determined by the pressure of such fluid, valve means associated with said one pressure head and including a control member for controlling the pressure of fluid acting on opposite sides of said piston and operable with said control member in a normal position to effect equalization of the opposing pressures of fluid on said piston for rendering said piston immovable and being operable upon movement of said control member out of said normal position to establish a differential between said opposing pressures to cause movement of said piston, and lever means connecting said lever and piston rod to said control member, said diaphragm being operable upon deflection relative to said piston to actuate said lever and lever means to move said control member out of said normal position, and said piston being operable upon movement relative to said diaphragm to actuate said lever means to move said control member to said normal position in a position of said piston corresponding to the position of said diaphragm.

3. In combination, a power cylinder having a piston bore closed at one end by a pressure head, a power piston mounted to reciprocate in said bore, valve means associated with said cylinder and including a control member for controlling the pressure of fluid on opposite sides of said piston and operable with said control member in a normal position to effect equalization of such pressures and upon movement of said control member out of said normal position to establish a differential between the pressures acting on opposite sides of said piston for causing movement of said piston, a structure secured to said pressure head, a flexible diaphragm clamped around its periphery between said pressure head and the adjacent end of said structure in coaxial relation with said piston, said pressure head and diaphragm cooperating to form a pressure chamber to receive fluid under pressure for deflecting said diaphragm in one direction, a second diaphragm spaced from the first named diaphragm and arranged in coaxial relation therewith, a member secured to said structure clamping the second named diaphragm around its periphery, said member and second named diaphragm cooperating to form a pressure chamber for receiving fluid under pressure for deflecting said second named diaphragm in the opposite direction, means connecting the two diaphragms together for movement in unison, a spring housing fixed with respect to said cylinder, spring means confined in said housing, a lever having a fulcrum connection with said structure intermediate the two diaphragms and having one lever arm connected to the diaphragm connecting means and another lever arm connected to said spring means to thereby render said spring means effective to oppose deflection of said diaphragm by fluid pressure supplied to either of said pressure chambers and for limiting movement of said lever to positions corresponding to the pressure of such fluid, and means connecting said lever and piston to said control member and operable upon deflection of either of said diaphragms relative to said piston by pressure of fluid supplied to the respective pressure chamber for moving said control member out of normal position and operable upon movement of said piston relative to said diaphragms for returning said control member to said normal position in a position of said piston corresponding to the position of said diaphragm.

4. In combination, a power cylinder having a piston bore, a pressure head closing each of the opposite ends of said bore, a power piston mounted to reciprocate in said bore, valve means associated with one of said pressure heads and including a control member for controlling the pressure of fluid acting on opposite sides of said piston, and operable with said control member in a neutral position to effect equalization of the opposing pressures of fluid on said piston and being operable upon movement of said control member out of said neutral position in one direction to establish a differential in pressures on said piston to effect movement thereof in one direction, said valve means being operable upon movement of said control member in the opposite direction from neutral position to establish a reversal of said differential in fluid pressures for effecting movement of said piston in the opposite direction, a pilot structure associated with the other pressure head and comprising two spaced flexible diaphragms arranged in coaxial relation with said piston, means connecting said diaphragms for deflection in unison, one diaphragm being subject at its outer face to pressure of fluid in a pressure chamber for deflecting the diaphragms in one direction, and the other diaphragm being subject at its outer face to pressure of fluid in another pressure chamber for deflecting the diaphragms in the opposite direction, a spring housing mounted on one side of said power cylinder, spring means confined in said housing, lever means operatively connecting said spring means to the diaphragm connecting means to thereby render said spring means effective to oppose deflection of said diaphragms by fluid under pressure in either direction and for defining positions of said lever means corresponding to pressure of fluid acting on either of said diaphragms, a piston rod having one end secured to said piston and extending through one of said pressure heads, an equalizing lever having an operating connection intermediate its ends with said control member, means connecting one end of said equalizing lever to said lever means, a third lever having a fulcrum connection with the first named pressure head and one lever arm connected with said piston rod and another lever arm connected with the opposite end of said equalizing lever, said diaphragms being operable upon deflection by fluid pressure supplied to either of said pressure chambers to effect operation of said lever means and thereby said equalizing lever for moving said control member out of said normal position and said piston being operable upon movement relative to said diaphragms for actuating said third lever and thereby said equalizing lever to return said control lever to said normal position in a position of said piston corresponding to the position of said diahpragms.

5. In combination, a power cylinder having a piston bore, pressure heads closing opposite ends of said bore, a piston mounted to reciprocate in said bore, a piston rod having one end secured to said piston and extending through one of said pressure heads to the exterior of said cylinder, valve means in said one pressure head for controlling pressure of fluid acting on opposite sides of said piston and comprising one plunger operable upon movement in one direction for increasing the pressure of fluid on one side of said piston and in the opposite direction to effect a reduction in such pressure, another plunger operable upon movement in said one direction for increasing the pressure of fluid on the opposite side of said piston and in the reverse direction for reducing the pressure of such fluid, an operating member disposed between said plungers and having a journal connection with said one pressure head, said member having one arm for actuating one of said plungers and an oppositely arranged arm for actuating the other of said plungers and having an operating member for actuating said arm, said operating member having a neutral position providing for positioning both of said arms and plungers to effect equalization of fluid pressures on the opposite sides of said piston and being operable upon movement from neutral position in one direction to effect movement of said plungers in opposite directions to provide a differential in pressures on said piston for moving same in one direction, said operating member being operable upon movement from neutral position in the opposite direction to effect reverse and opposite movement of said plungers for providing a reverse differential on said piston for urging same in the opposite direction, an equalizing lever having intermediate its ends an operating connection with said operating member, means connected to one end of said equalizing member for actuating same to move said operating member out of neutral position and means connecting said piston rod to the opposite end of said equalizing lever and operable by said piston to move said operating member to its neutral position with the opposite end of said equalizing lever fixed against movement.

6. In combination, a power cylinder having a piston bore, pressure heads closing opposite ends of said bore, a piston mounted to reciprocate in said bore, a piston rod having one end secured to said piston and extending through one of said pressure heads to the exterior of said cylinder, valve means in said one pressure head for controlling pressure of fluid acting on opposite sides of said piston and comprising an operating member having a neutral position providing for equalization of fluid pressures on the opposite sides of said piston and being operable upon movement from neutral position in one direction to provide a differential in pressures on said piston for moving same in one direction, said operating member being operable upon movement from neutral position in the opposite direction to provide a reverse differential in pressures on said piston for urging same in the opposite direction, a flexible diaphragm clamped around its periphery to the other pressure head having at one side a pressure chamber, a spring housing secured to one side of said power cylinder, spring means confined within said housing, a diaphragm lever having a fixed fulcrum and having one arm connected to said diaphragm and another arm connected to said spring means, said diaphragm being deflectable upon supply of fluid under pressure to said pressure chamber to rock said diaphragm lever against the opposing force of said spring means to a position defined by the pressure of fluid in said pressure chamber, an equalizing lever connected intermediate its ends to said operating member and having one end connected to said diaphragm lever, means connecting said piston rod to the opposite end of said equalizing lever, deflection of said diaphragm being operative to actuate said equalizing lever to rock said operating member out of neutral position and said piston being operative upon movement relative to said diaphragm to actuate said equalizing lever to return said operating member to said neutral position.

ARTHUR G. LARSON.

REFERENCES CITED

The following references are of record in the file of this patent:

UNITED STATES PATENTS

| Number | Name | Date |
|---|---|---|
| 1,157,820 | Storer | Oct. 26, 1915 |
| 1,230,049 | Stafford | June 12, 1917 |
| 1,231,257 | Herr | June 26, 1917 |
| 1,452,204 | Luetscher | Apr. 17, 1923 |
| 1,480,940 | Lang | Jan. 15, 1924 |
| 1,855,386 | Doolittle | Apr. 26, 1932 |
| 2,102,504 | Beardsley | Dec. 14, 1937 |
| 2,120,010 | Thaler | June 7, 1938 |
| 2,125,949 | O'Connor | Aug. 9, 1938 |
| 2,209,418 | Overbeke | July 30, 1940 |
| 2,273,171 | Bennett | Feb. 17, 1942 |
| 2,296,563 | Moller | Sept. 22, 1942 |
| 2,299,430 | Sexton | Oct. 20, 1942 |
| 2,304,472 | Olsson | Dec. 8, 1942 |
| 2,344,768 | Dodson | Mar. 21, 1944 |